3,350,347
Patented Oct. 31, 1967

3,350,347
STABILIZED POLYPROPYLENE
John A. Casey, Chagrin Falls, Ohio, assignor to Sun Oil Company, Philadelphia, Pa., a corporation of New Jersey
No Drawing. Filed July 29, 1960, Ser. No. 46,046
8 Claims. (Cl. 260—45.95)

This invention relates to the stabilization of solid, substantially crystalline, isotactic polypropylene, and more particularly to new compositions of matter comprising such a solid polymer of relatively high weight and an inhibitor therefor.

Solid, substantially crystalline, isotactic polypropylene can be prepared by the polymerization of propylene using a solid catalytic material. A catalyst system which is especially effective for such a polymerization is the combination of a lower halide of titanium, such as titanium trichloride, and an aluminum trialkyl, such as aluminum triethyl. This catalyst can be prepared by admixing, for example, titanium tetrachloride and aluminum triethyl in an inert solvent such as isooctane, thereby to both reduce the tetrachloride and complex it with the alkyl to produce a reaction product which catalyzes the polymerization of the monomer to solid polymers. If desired, a lower halide such as titanium trichloride can be preformed, dispersed in an inert liquid, and an activator, such as an aluminum trialkyl, added. In performing the polymerization step, the propylene monomer is contacted with the solid complex catalyst, such as by passing the propylene into the liquid reaction mixture, and is thereby polymerized to solid polymers. Anhydrous and oxygen-free conditions are used throughout the process, since the catalyst is deactivated by contact with water or oxygen. Other specific catalyst systems, i.e. other metal halide or metal oxide catalyst systems, as well as other process conditions, necessary for the preparation of the polypropylene decribed herein are illustrated by pages 350 through 361, pages 416 through 419, pages 452 and 453 of "Linear and Stereoregular Addition Polymers" by Norman G. Gaylord & Herman F. Mark, Interscience Publishers, 1959, the contents of which are incorporated herein by reference.

Polypropylene prepared by the process described above has a melting point of from 160° C. to 170° C., a tensile strength of from 3,000 to 6,000 p.s.i. (pounds per square inch), and a molecular weight of from 50,000 to 850,000 or more (light-scattering). Usually, a mixture of crystalline and amorphous polypropylene is obtained. If desired, the amorphous polymer can be separated from the crystalline polymer which is isotactic in nature by contacting a mixture thereof with a hydrocarbon solvent such as isooctane or n-heptane at an elevated temperature. Amorphous polypropylene is substantially soluble under these conditions, whereas crystalline polypropylene is substantially insoluble. The compositions of the present invention are either prepared from such crystalline polymers or mixtures of crystalline with amorphous polymers, in which the mixture contains at least 25%, and preferably at least 50%, by weight of the crystalline polypropylene.

The foregoing polypropylene may be molded or otherwise fabricated to form many useful articles; however, it is susceptible to degradation by heat, oxidation, and mechanical working. This degradation apparently results from free-radical formation, which formation is promoted by heat, ultra-violet light, mechanical action, and impurities such as metals and metal compounds. The free-radicals which are formed undergo chemical reactions, resulting in undesirable chemical and physical transformations. Thus polypropylene deteriorates prematurely, loses tensile strength, molecular weight and other desirable properties, such as pliability and impact strength, and becomes discolored and embrittled.

An object of the present invention is to provide compositions comprising substantially crystalline, isotactic, solid polypropylene containing a minor quantity of a material effective to stabilize the polymer against degradation. It is another object of this invention to provide compositions comprising such polymers containing minor quantities of a stabilizing material effective to substantially prevent degradation of such polypropylene caused by heat, oxidation, mechanical action, or ultraviolet light.

According to the present invention, applicant has found that remarkably stable polypropylene compositions may be prepared by admixing with the substantially crystalline, solid, isotactic polymer a stabilizing quantity of an arylene-bis-phenol having the formula:

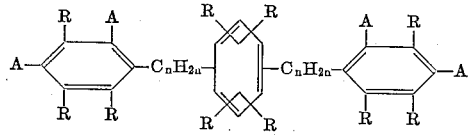

wherein $n$ is 0 to 8, one A on each ring is hydroxyl and the other is hydrogen or a hydrocarbon radical containing 1 to about 16 carbon atoms, and R is hydrogen or a hydrocarbon radical containing 1 to about 16 carbon atoms, the hydroxy aromatic rings being positioned on the arylene ring so as to be meta or para to one another. For example, suitable compounds which are useful according to this invention include bis-(2-hydroxy-3-t-butyl-5-methylbenzyl) - durene, bis-(2-hydroxy - 3-t-butyl-5-methylbenzyl) - isodurene, bis-(2-hydroxy - 3-t-octyl-5-isopropylbenzyl) - durene, bis-(2-hydroxy-3-t-octyl-5-isopropylbenzyl) - isodurene, bis-(3,5-di-t-butyl - 4-hydroxybenzyl) - durene, bis-(2-hydroxy - 3-t-butyl - 5-ethylbenzyl) - 1,2,4,5-tetraethylbenzene, bis-(2-hydroxy - 3-t-butyl - 5-isopropylbenzyl) - 1,2,4,5-tetraisopropylbenzene, bis-(2-hydroxy - 3-t-amyl - 5-methylbenzyl) - durene, bis-(2-hydroxy - 3-isopropyl - 5-methylbenzyl) - durene, bis-(2-hydroxy - 3-sec.-butyl - 5-n-butylbenzyl) - durene, bis-(2-hydroxy-3-t-butyl - 5-n-propylbenzyl)-durene, and the like.

The present invention is described herein in terms of certain preferred embodiments; however, it covers equivalent procedures, materials and quantities. Broadly it is required that a quantity of the stabilizer sufficient to impart stability to the polypropylene be used. Thus the quantity to be used will make itself apparent to those skilled in the art depending upon the circumstances under which the stabilized polymer is to be used. Although greater or lesser quantities can be used, it is generally necessary that from about 0.01% to about 5% by weight of the stabilizer be used with the polypropylene, a quantity of from about 0.05% to about 2% by weight of the stabilizer being preferred. By using a stabilizing quantity, e.g. from about 0.05% to about 2% by weight, of the arylene-bis-phenol of this invention in combination with the polypropylene described herein, remarkable stability is imparted thereto against degradation by heat and oxidation, that caused by mechanical action, such as extrusion, and that made apparent by way of discoloration of the polymer. It is known that the melt index of non-stabilized polyethylene, as well as its melt index ratio, decrease drastically when polyethylene is subjected to elevated temperature and mechanical shear; see, for example, Australian Patent 201,160, Jan. 11, 1956. Data herein illustrate that quite unexpectedly both the melt index and the melt index ratio of the non-stabilized polypropylene described herein increase drastically when it is subjected to elevated temperature and mechanical shear. Clearly, then, the mechanism by which polyethylene degrades is entirely different from the mechanism by which polypropylene degrades. Whereas chain scission takes place in polypropylene when it is subjected to elevated temperature and mechanical shear, such conditions apparently cause crosslinking in polyethylene. Consequently, it is equally clear that the mechanism by which polypropylene is stabilized is entirely unrelated to that by which polyethylene is stabilized.

The polypropylene described herein and the stabilizer may be combined by any method suitable for the preparation of homogeneous mixtures. For example, polypropylene may be melted and the stabilizer admixed therewith by milling on heated rolls, or by using a Banbury mixer. On the other hand, the stabilizer may be combined, in the solid or molten state, with a solution or suspension of the polymer in a suitable liquid. In another process, the stabilizer is dissolved in a suitable solvent, admixed with powdered polymer, and the solvent evaporated. In another mode of operation, the solid stabilizer is thoroughly dry-mixed with solid polymer polypropylene. In general, it is preferable that the mixing process be carried out in an inert atmosphere, or under vacuum, in order to prevent oxidation of the polymer.

Since unstabilized polypropylene is normally drastically degraded during formation into articles of manufacture, e.g. by extrusion, molding, rolling, etc., the extent of this degradation is measured in order to illustrate the effectiveness of the stabilizers of this invention. One method of determining the extent of degradation is that obtained by observing the change in melt index of the polymer upon working of the same at elevated temperature. Melt index is a measure of melt viscosity, and is the rate, in grams per 10 minutes, at which the composition being tested is extruded through an orifice 0.0823 inch in diameter from a barrel 0.3760 inch in diameter under the force of a piston weighing 2160 grams, the composition being maintained at 230° C. (446° F.) during the extrusion. The initial melt index is determined by loading the cylinder with the composition to be tested, applying the stated piston pressure, and heating for 5 minutes. Any extrudate produced during this 5-minute period is cut off, and the extrudate for the next 6 minutes is measured. The amount of this extrudate, converted to grams per 10 minutes (by multiplying 1⅔) is the initial melt index ($MI_a$). The remainder of the composition being tested is then extruded. This extrudate is combined with that produced in the first 11 minutes, and the combined extrudates are returned to the cylinder. After 10 more minutes at 230° C., the piston is again brought to bear and all the test composition is extruded. The extruded test composition is again returned to the cylinder, held for 10 minutes, and extruded. This extrudate is retuned to the cylinder and piston pressure applied immediately. After 4 minutes all extrudate is cut off and discarded, and the extrudate for the next 6 minutes measured. The amount of this extrudate, converted to grams per 10 minutes, is the final melt index ($MI_b$). The stability of a polymer composition is indicated by the ratio of $MI_b$ to $MI_a$, a low ratio indicating a high degree of stability. This ratio should be less than about 4.0 in order for the composition to be adaptable to a wide variety of processing methods, although slightly higher ratios are suitable for many applications.

In addition to degradation occurring during fabrication as described above, articles made from unstabilized polypropylene are also rapidly degraded and oxidized by exposure to high temperatures during normal use of such articles. Such degradation and oxidation is evidenced by discoloration and by crazing and crumbling of the surface of the molded article. The crazing consists of small surface cracks which, once started, progress quite rapidly until the entire surface of the article is crazed. The crumbling also progresses quite rapidly after it first becomes noticeable, i.e. molded articles becoming so friable that edges and corners are easily rubbed off with the fingers.

In the examples below, the molded articles used were molded sheets of polypropylene, 3/32" to 1/8" thick. Above 3/32" the thickness of the sheet appears to have little or no effect on the resistance of the polypropylene to heat and oxidation. These sheets were placed in an oven and held at 280° F. until crazing appeared, or until they became friable, as evidenced by breaking a corner or an edge with the fingers. The oven life recorded in the examples is the number of hours at 280° F. before such evidence of degradation and oxidation appeared. An oven life of at least 500 hours is necessary for a polymer composition to be useful in a majority of applications.

Unstabilized polypropylene also becomes badly discolored during exposure to high temperatures. This discoloration does not appear to be directly related to the oxidation and degradation of the surface. Although the basic reason for the discoloration is not known with certainty, it appears that it may be caused by various impurities in the polymer, such as the residue from the polymerization catalyst. It also appears that many stabilizers impart some color to the polymer, even though these stabilizers are effective to reduce degradation and oxidation of the polyolefins. The high temperatures used during fabrication, or the high temperatures encountered in various applications of the polymer, apparently initiate some reaction between the various impurities which results in discoloration of the polymer.

A color scale has been devised to compare the colors of polypropylene articles. Colors on the scale range from No. 1, which is nearly clear, about like frosted glass, to No. 10, which is a dark, reddish brown, similar to dark mahogany, No. 2 color being slightly tinged with yellow, and No. 4 color having a slight orange tinge. Colors from 1 to 4 are deemed satisfactory for practically all applications of polypropylene, while darker colors limit the use of the polymers to those applications where a dark color is not objectionable.

This application is a continuation-in-part of application Ser. No. 791,251 filed Feb. 5, 1959.

The following examples, wherein the proportion of stabilizers used indicates the weight percent of the stabilizers based on the weight of the compositions, illustrate the compositions of this invention, the scope of the invention being determined by the scope of the appended claims.

*Example I*

A 100 gallon reactor was charged with 40 gallons of iso-octane, 0.0025 lb./gallon of titanium trichloride and 0.0037 lb./gallon of triethylaluminum. When pressured to 140 p.s.i., with propylene, polymerization took place at 157° F. to produce polypropylene at a rate of 0.23 lb./gal./hour. This polymer was 0.45% by weight pentane-soluble, and 4.16% by weight of heptane-soluble. It had a molecular weight of 390,000 by light scattering and a melting point of 168° F. This is Polypropylene A. The foregoing procedure was repeated except that 0.0013 lb./gal. of titanium trichloride, 0.0019 lb./gal. of triethylaluminum, and a temperature of 158° F. were used to give a polymerization rate of 0.1 lb./gal./hour. This is Polypropylene B which, upon dry-mixing with Polypropylene A, gave a product having a molecular weight of about 310,000 by light scattering and a melting point of 168° F. Its pentane-soluble portion was 0.59% by weight, its heptane-soluble portion 7.27% by weight, and it was about 55% crystalline.

The foregoing mixture of Polypropylenes A and B was dry-mixed, with vigorous stirring, with 0.5% by weight of bis-(2-hydroxy-3-tertiarybutyl-5-methylbenzyl)-durene as a stabilizer. When evaluated by the procedures described hereinabove, the properties tabulated in Table I are observed.

TABLE I

| Sample | $MI_a$ | $\frac{MI_b}{MI_a}$ | $MI_a$ Color | 280° F. Oven Life (Hours) |
|---|---|---|---|---|
| A+B | 0.192 | 10.5 | 1 | 12 |
| A+B+Stabilizer | 0.62 | 2.5 | 4 | 1,404 |

Thus the foregoing durene derivative imparts good processing stability as shown by the melt index ratio, acceptable color and good oven life.

Examples II and III

When the procedure of Example I is repeated at the 0.25% and 1.0% level, the oven life of each stabilized sample is in excess of 500 hours.

Example IV

When polypropylene prepared in substantially the same manner as in Example I, and having a molecular weight of 370,000 by light scattering, a crystallinity of 50%, a pentane-soluble portion of 0.87% by weight and a heptane-soluble portion of 2.72% was dry-mixed as in Example I with 0.5 weight percent of the durene derivative of Example I, the following properties are observed: $MI_a$=0.056, $MI_b/MI_a$=1.5, $MI_a$ color=3, and 280° F. Oven Life=1566 hours. Thus this durene derivative provides excellent processability, good color and good 280° F. oven life.

Example V

The stabilized polypropylene of Example IV was tested in the 280° F. oven in contact with a brass shim, giving an oven life of in excess of 580 hours as compared with 70 hours for a commercially available stabilized molding grade polypropylene.

Example VI

The polypropylene prepared according to Example IV was stabilized by compounding the same, in the manner described in Example I, with 0.25 wt. percent of 2,6-ditertiarybutyl-4-methyl-phenol and 0.25 wt. percent of the durene derivative of Example I, resulting in a $MI_a$ of 1.0, a $MI_b/MI_a$ of 1.6, a $MI_a$ color of 4, and a 280° F. oven life exceeding 760 hours.

Example VII

When the stabilized polypropylene of Example VI is stored in contact with a brass shim, as in Example V, it has a 280° F. oven life in excess of 595 hours.

The invention claimed is:
1. A polymer composition having improved oxidation and thermal stability comprising isotactic, substantially crystalline polypropylene and a stabilizing quantity of an arylene-bis-phenyl having the general formula:

wherein R is a tertiary alkyl group having 4 to 8 carbon atoms; R' is an alkyl group selected from the group consisting of normal alkyl groups and secondary alkyl groups having 1 to 4 carbon atoms; and R'' is an alkyl group selected from the group consisting of methyl, ethyl and isopropyl.

2. A stabilized polymeric composition comprising normally solid polypropylene and a stabilizing amount of a phenol having the formula wherein R is selected from the group consisting of secondary alkyl radicals and tertiary alkyl radicals containing 3–8 carbon atoms; R' is an alkyl radical contining 1–4 carbon atoms; and X is selected from the group consisting of durylene radicals and isodurylene radicals.

3. The composition of claim 1 wherein said arylene-bisphenol is bis-(2-hydroxy-3-tertiary butyl-5-methylbenzyl) durene.

4. The composition of claim 1 wherein said stabilizing quantity is from about 0.01% to about 5% by weight of said composition.

5. The composition of claim 4 wherein said arylene-bisphenol is bis-(2-hydroxy-3-tertiary butyl-5-methylbenzyl) durene.

6. The composition of claim 1 wherein said stabilizing quantity is from about 0.05% to about 2% by weight of said composition.

7. The composition of claim 6 wherein said arylene-bisphenol is bis-(2-hydroxy-3-tertiary butyl-5-methylbenzyl) durene.

8. A stabilized polymeric composition comprising normally solid polypropylene and a stabilizing amount of bis(2-hydroxy-3-tertiarybutyl-5-methyl benzyl)durene.

References Cited

UNITED STATES PATENTS

| 2,957,849 | 10/1960 | Kennedy | 260—45.95 |
| 2,985,617 | 5/1961 | Salyer et al. | 260—45.95 |
| 3,062,895 | 11/1962 | Martin et al. | 260—45.95 |

FOREIGN PATENTS

| 806,014 | 12/1958 | Great Britain. |
| 1,171,286 | 9/1958 | France. |
| 1,020,875 | 2/1953 | France. |

DONALD E. CZAJA, *Primary Examiner.*

J. R. LIEBERMAN, M. STERMAN, A. D. SULLIVAN,
*Examiners.*

S. H. BLECH, H. W. HAEUSSLER, H. E. TAYLOR,
*Assistant Examiners.*